United States Patent
Yaron et al.

[11] Patent Number: 6,111,583
[45] Date of Patent: Aug. 29, 2000

[54] APPARATUS AND METHOD FOR THREE-DIMENSIONAL TERRAIN RENDERING

[75] Inventors: Ronnie Yaron, Raanana; Ofer Shor, Tel Aviv, both of Israel

[73] Assignee: Skyline Software Systems Ltd., Givat Shmuel, Israel

[21] Appl. No.: 08/939,948

[22] Filed: Sep. 29, 1997

[51] Int. Cl.[7] .................................................. G06T 15/40
[52] U.S. Cl. ............................ 345/421; 345/424; 345/426
[58] Field of Search .................................... 345/421, 426, 345/424

[56] References Cited

U.S. PATENT DOCUMENTS

| | | |
|---|---|---|
| 3,602,702 | 8/1971 | Warnock et al. . |
| 3,621,214 | 11/1971 | Romney et al. . |
| 3,665,408 | 5/1972 | Erdahl et al. . |
| 3,671,729 | 6/1972 | Lux . |
| 3,736,564 | 5/1973 | Watkins . |
| 3,769,442 | 10/1973 | Heartz et al. . |
| 4,017,985 | 4/1977 | Heartz . |
| 4,179,823 | 12/1979 | Sullivan et al. . |
| 4,219,763 | 8/1980 | Dalke . |
| 4,343,037 | 8/1982 | Bolton . |
| 4,399,512 | 8/1983 | Soma et al. . |
| 4,583,185 | 4/1986 | Heartz . |
| 4,586,038 | 4/1986 | Sims et al. . |
| 4,590,569 | 5/1986 | Rogoff et al. . |
| 4,609,917 | 9/1986 | Shen . |
| 4,622,632 | 11/1986 | Tanimoto et al. . |
| 4,625,290 | 11/1986 | White . |
| 4,631,690 | 12/1986 | Corthout et al. . |
| 4,641,255 | 2/1987 | Hohmann . |
| 4,660,157 | 4/1987 | Beckwith et al. . |
| 4,677,576 | 6/1987 | Berlin, Jr. et al. . |
| 4,685,070 | 8/1987 | Flinchbaugh . |
| 4,694,404 | 9/1987 | Meagher . |
| 4,721,952 | 1/1988 | Huber . |
| 4,727,474 | 2/1988 | Batcher . |
| 4,752,828 | 6/1988 | Chapuis et al. . |
| 4,775,946 | 10/1988 | Anjyo . |
| 4,791,579 | 12/1988 | Kranitzky . |
| 4,805,121 | 2/1989 | Scott et al. . |
| 4,847,788 | 7/1989 | Shimada . |
| 4,847,789 | 7/1989 | Kelly et al. . |
| 4,855,937 | 8/1989 | Heartz . |
| 4,876,651 | 10/1989 | Dawson et al. . |
| 4,884,220 | 11/1989 | Dawson et al. . |
| 4,890,249 | 12/1989 | Yen . |
| 4,899,293 | 2/1990 | Dawson et al. . |
| 4,940,972 | 7/1990 | Mouchot et al. . |
| 4,974,177 | 11/1990 | Nishiguchi . |
| 4,985,854 | 1/1991 | Wittenburg . |
| 5,020,014 | 5/1991 | Miller et al. . |
| 5,179,638 | 1/1993 | Dawson et al. . |
| 5,243,665 | 9/1993 | Maney et al. . |
| 5,299,300 | 3/1994 | Femal et al. . |
| 5,307,450 | 4/1994 | Grossman . |
| 5,317,689 | 5/1994 | Nack et al. . |
| 5,333,248 | 7/1994 | Christensen . |
| 5,446,804 | 8/1995 | Allebach et al. . |
| 5,471,572 | 11/1995 | Buchner et al. . |
| 5,495,562 | 2/1996 | Denney et al. . |
| 5,528,735 | 6/1996 | Strasnick et al. . |
| 5,550,959 | 8/1996 | Freeman . |
| 5,555,354 | 9/1996 | Strasnick et al. . |
| 5,566,073 | 10/1996 | Margolin . |
| 5,579,455 | 11/1996 | Greene et al. . |
| 5,579,456 | 11/1996 | Cosman . |
| 5,586,230 | 12/1996 | Leon et al. . |
| 5,594,844 | 1/1997 | Sakai et al. . |
| 5,600,763 | 2/1997 | Greene . |
| 5,619,627 | 4/1997 | Soderberg et al. . |

*Primary Examiner*—Mark R. Powell
*Assistant Examiner*—Motilewa Good-Johnson
*Attorney, Agent, or Firm*—Testa, Hurwitz & Thibeault, LLP

[57] ABSTRACT

A method for rendering a three-dimensional terrain, the method including providing at least one previous display pixel having a previous ray from a point of view through the at least one previous display pixel to a previous terrain unit intersecting an axis of the previous ray, the previous ray having a length, and computing a subsequent ray from the point of view through a subsequent display pixel, whereby the subsequent ray has a length equal to the length of the previous ray.

8 Claims, 11 Drawing Sheets

Microfiche Appendix Included
(2 Microfiche, 127 Pages)

APPARATUS AND METHOD FOR THREE-DIMENSIONAL TERRAIN RENDERING

FIELD OF THE INVENTION

The present invention relates to computerized graphics systems in general, and in particular to computerized graphics systems for rendering images of three-dimensional terrain.

BACKGROUND OF THE INVENTION

Rendering terrain based on data representations of three-dimensional (3D) topographies for viewing on a computer display is known in the art. Typically, a three-dimensional terrain is represented as a collection of data points and stored in a data structure. Terrain rendering techniques generally apply some form of ray tracing to a set of data points. Known ray tracing techniques involve tracing a ray from the view point through each pixel in the display until the ray reaches the surface of the data. The primary disadvantage of ray tracing is that its implementation is quite slow, taking minutes or hours to produce an image of a single scene, even using state of the art hardware and software.

SUMMARY OF THE INVENTION

The present invention seeks to provide novel apparatus and methods for rendering three-dimensional terrains that do not require ray tracing for all data points in a viewable area. The present invention provides an improved system which overcomes the known disadvantages of the prior art as discussed above. The rendering is performed using a variation on known ray tracing techniques where a first ray is traced for a first display pixei, and adjacent pixels are calculated by moving the point of contact between the first ray and the surface of the data to a point on a ray that goes through an adjacent pixel. The point is then moved forward or backward along the new ray until it contacts the surface or the data.

There is thus provided in accordance with a preferred embodiment of the present invention a method for rendering a three-dimensional terrain, the method including providing at least one previous display pixel having a previous ray from a point of view through the at least one previous display pixel to a previous terrain unit intersecting an axis of the previous ray, the previous ray having a length, and computing a subsequent ray from the point of view through a subsequent display pixel, whereby the subsequent ray has a length equal to the length of the previous ray.

Further in accordance with a preferred embodiment of the present invention the providing step includes tracing the at least one previous ray through the at least one previous display pixel.

Still further in accordance with a preferred embodiment of the present invention the providing step includes previously computing the at least one previous ray.

Additionally in accordance with a preferred embodiment of the present invention the providing step includes providing a plurality of the previous display pixels, and wherein the computing step includes computing a subsequent ray the subsequent display pixel is adjacent to at least two of the plurality of the previous display pixels, and whereby the subsequent ray has a length equal to the shortest of the lengths of the previous rays of the plurality of previous display pixels to which the subsequent display pixel is adjacent.

Moreover in accordance with a preferred embodiment of the present invention the preceding claims and further including the step of maintaining any of the lengths in a Z-buffer, and the providing step includes retrieving any of the lengths from the Z-buffer.

Further in accordance with a preferred embodiment of the present invention the length of the subsequent ray is adjusted for a subsequent terrain unit intersecting an axis of the subsequent ray.

Still further in accordance with a preferred embodiment of the present invention the adjusting step includes comparing a position of a ray point at an end of the subsequent ray to an elevation of the subsequent terrain unit, correcting the length of the subsequent ray by either of increasing the length of the subsequent ray if the position of the ray point is above the subsequent terrain unit, and decreasing the length of the subsequent ray if the position of the ray point is below the subsequent terrain unit, and repeating the correcting step until the ray point is in propinquity to the subsequent terrain unit.

Additionally in accordance with a preferred embodiment of the present invention the repeating step includes repeating until the ray point is in propinquity to the subsequent terrain unit within a predetermined tolerance.

Moreover in accordance with a preferred embodiment of the present invention the correcting step includes increasing the length of the subsequent ray by a factor, and incrementing the factor by a base value subsequent to the increasing step.

Further in accordance with a preferred embodiment of the present invention the incrementing step includes providing the base value equal to $V_r + 2^d$, the $V_r$ is equal to a unit vector value of the subsequent ray and d is equal to $\Log_2$ of the length of the subsequent ray.

Still further in accordance with a preferred embodiment of the present invention the correcting step includes decreasing the length of the subsequent ray by a base value.

Additionally in accordance with a preferred embodiment of the present invention the correcting step includes providing the base value equal to $V_r + 2^d$, the $V_r$ is equal to a unit vector value of the subsequent ray and d is equal to $\Log_2$ of the length of the subsequent ray.

There is also provided in accordance with a preferred embodiment of the present invention a method of determining a scan direction, the method including providing a perspective axis passing through a view point and being substantially perpendicular to a data plane, the data plane includes a plurality of terrain units of a uniform elevation, providing a perspective point at an intersection of the perspective axis and a display plane of a display, rotating the perspective axis about the perspective point until the perspective axis lies in the display plane, thereby providing a longitudinal quadrant axis, providing a latitudinal quadrant axis perpendicular to the longitudinal quadrant axis and intersecting the longitudinal quadrant axis at the perspective point, and setting the scan direction as being either of away from the perspective point if the view point is above the perspective point, and toward the perspective point if the view point is below the perspective point.

Further in accordance with a preferred embodiment of the present invention either of the quadrant axes are moved in the display plane until the perspective point meets an edge of the display.

Still further in accordance with a preferred embodiment of the present invention either of the perspective axis and the display plane are adjusted until the perspective axis and the display plane intersect.

There is also provided in accordance with a preferred embodiment of the present invention a method of storing a terrain image in a data structure, the method including providing the terrain image in at least one resolution, dividing each resolution into at least one tile including at least one picture element.

Further in accordance with a preferred embodiment of the present invention either of a color attribute and an elevation attribute are stored for each of the picture elements.

Still further in accordance with a preferred embodiment of the present invention the dividing step includes providing the tile with a fixed number of the picture elements.

Additionally in accordance with a preferred embodiment of the present invention the providing the terrain image step includes providing a plurality of the resolutions and further including providing at least one pointer from a parent tile of a first of the plurality of the resolutions to a child tile of a second of the plurality of the resolutions, the first of the plurality of the resolutions is of lesser detail than the second of the plurality of the resolutions.

Moreover in accordance with a preferred embodiment of the present invention the first of the plurality of the resolutions has four times more detail than the second of the plurality of the resolutions.

There is also provided in accordance with a preferred embodiment of the present invention a method of storing terrain image ties in a memory, the method including determining a currently viewed tile, reading at least one near tile contiguous to the currently viewed tile into the memory, dividing the currently viewed tile into a plurality of sections, determining a currently viewed section of the currently viewed tile, and reading at least one far tile not abutting the currently viewed tile into the memory, the far tile is at a predetermined orientation relative to the currently viewed section.

Further in accordance with a preferred embodiment of the present invention the reading at least one near tile step includes reading eight tiles the each of the eight tiles abuts the currently viewed tile.

Still further in accordance with a preferred embodiment of the present invention the dividing step includes dividing the currently viewed tile into four sections including top-left, top-right, bottom-left, and bottom-right sections.

Additionally in accordance with a preferred embodiment of the present invention the reading at least one far tile step includes reading a row of tiles parallel to an outer edge of the currently viewed section, the currently viewed section is intermediate to the row and another of the sections.

Moreover in accordance with a preferred embodiment of the present invention the reading at least one far tile step includes reading a column of tiles parallel to an outer edge of the currently viewed section, the currently viewed section is intermediate to the column and another of the sections.

Further in accordance with a preferred embodiment of the present invention the reading at least one far tile step includes reading a row of tiles parallel to an outer edge of the currently viewed section, the currently viewed section is intermediate to the row and another of the sections, and reading a column of tiles parallel to an outer edge of the currently viewed section, the currently viewed section is intermediate to the column and another of the sections.

Still further in accordance with a preferred embodiment of the present invention either of the reading a row step and the reading a column step includes reading three tiles.

Additionally in accordance with a preferred embodiment of the present invention a corner tile intersecting the row and the column is read.

Moreover in accordance with a preferred embodiment of the present invention any of the steps are performed for a plurality of resolution levels.

Further in accordance with a preferred embodiment of the present invention any of the reading steps includes reading into a disk cache memory.

There is also provided in accordance with a preferred embodiment of the present invention a method of managing terrain image tiles in a memory, the method including maintaining an index including a coordinate of each of a plurality of stored tiles and a pointer to each of the plurality of stored tiles, searching the index for an index entry matching a coordinate of a requested tile, incrementing a plurality of use counters for a rendering cycle, each of the plurality of use counters corresponding to a one of the plurality of stored tiles, if the coordinate of the requested tile is found in the index returning the pointer to the stored tile the coordinate of the stored tile matches the coordinate of the requested tile, and zeroing the use counter corresponding to the stored tile the coordinate of the stored tile matches the coordinate of the requested tile, and if the coordinate of the requested tile is not found in the index determining a least recently used stored tile whose use counter is highest among the plurality of use counters, and reading the requested tile into the memory, whereby the least recently used stored tile is replaced with the requested tile.

Further in accordance with a preferred embodiment of the present invention the maintaining an index step includes maintaining an index of at least one bit of each of the coordinates of the plurality of stored tiles.

Still further in accordance with a preferred embodiment of the present invention the maintaining an index step includes maintaining an index of 5 least-significant bits of each of the coordinates of the plurality of stored tiles.

Additionally in accordance with a preferred embodiment of the present invention the searching step includes searching using at least one bit of the coordinate of the requested tile.

Moreover in accordance with a preferred embodiment of the present invention the maintaining an index step includes maintaining an index of at least one bit of each of the coordinates of the plurality of stored tiles, the searching step includes searching using at least one bit of the coordinate of the requested tile, and if the at least one bit of coordinate of the requested tile is found in the index, further including verifying that a full coordinate of the requested tile matches a full coordinate of the stored tile corresponding to the index entry.

Further in accordance with a preferred embodiment of the present invention, if the coordinate of the requested tile is not found in the index, a disk cache memory is saerched for the requested tile and the reading step includes reading the requested tile from the disk cache memory.

There is also provided in accordance with a preferred embodiment of the present invention three-dimensional terrain rendering apparatus including a display having a plurality of pixels, a memory for recording a relationship between at least one previous display pixel, a previous ray from a point of view through the at least one previous display pixel to a previous terrain unit intersecting an axis of the previous ray, and a length of the previous ray, and apparatus for computing a subsequent ray from the point of view through a subsequent display pixel given the relationship, whereby the subsequent ray has a length equal to the length of the previous ray.

BRIEF DESCRIPTION OF THE DRAWINGS

The present invention will be understood and appreciated from the following detailed description, taken in conjunction with the drawings in which.

Attached herewith is a microfiche appendix comprising appendices A, B, and C which aid in the understanding and appreciation of one preferred embodiment of the invention shown and described herein. Appendices A, B, and C taken together form a computer listing of a preferred software embodiment of the present invention.

TERMS

The following terms are useful in understanding the detailed description:

| | |
|---|---|
| $V_p$ | View point |
| R | Ray |
| $R_p$ | A point along a ray |
| $V_r$ | Unit vector from Vp through a display pixel |
| P | Display pixel |
| $R_l$ | Distance from $R_p$ to $V_p$ |
| d | $Log_2$ of $R_l$ |
| $P_p$ | Perspective point |
| T | Terrain unit |
| $T_e$ | Elevation of a terrain unit |
| $D_p$ | A plane comprising terrain units T where $T_e$=0 for all T |
| X,Y,Z | Axes of a Cartesian coordinate system where X and Y are the two-dimensional axes of the data plane |
| $V_b$ | Base increment value |
| $V_i$ | Increment value |

DETAILED DESCRIPTION OF PREFERRED EMBODIMENTS

Figure 1A:
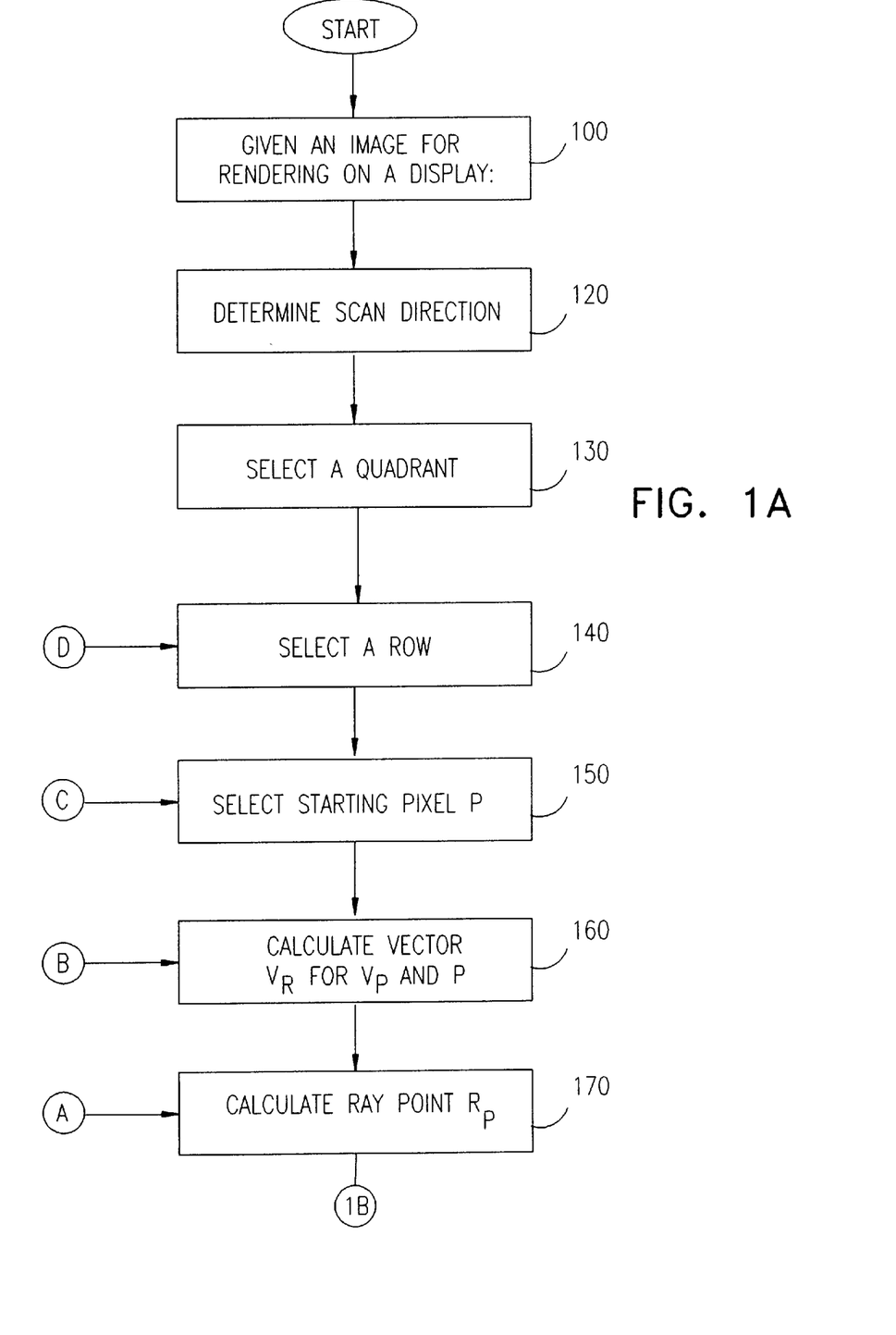
Figs. 1A–1C, taken together, are simplified flowchart illustrations of a method of three-dimensional terrain rendering constructed and operative in accordance with a preferred embodiment of the present invention.
Figure 1B:
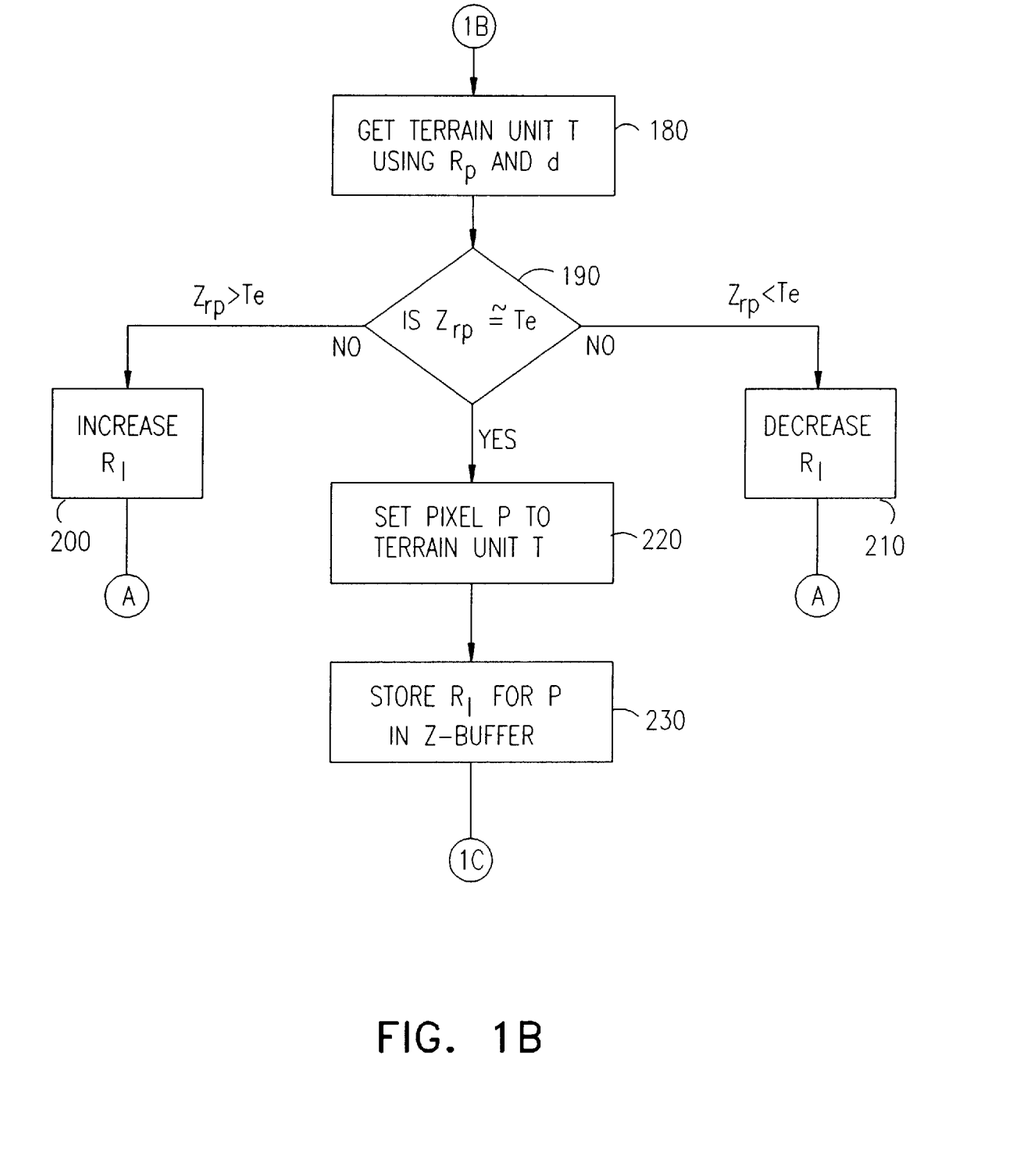
Figure 1C:
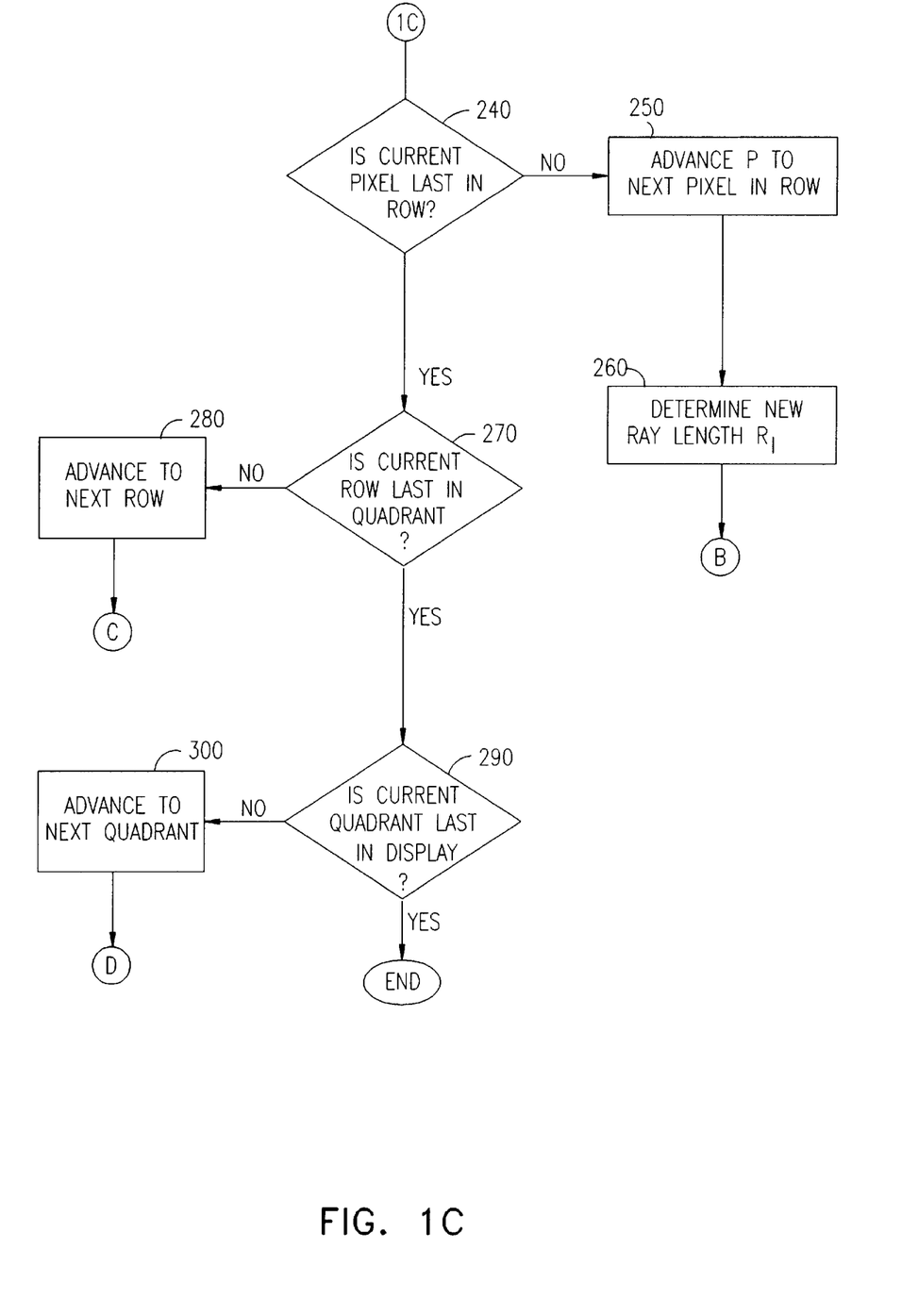
Figure 2:
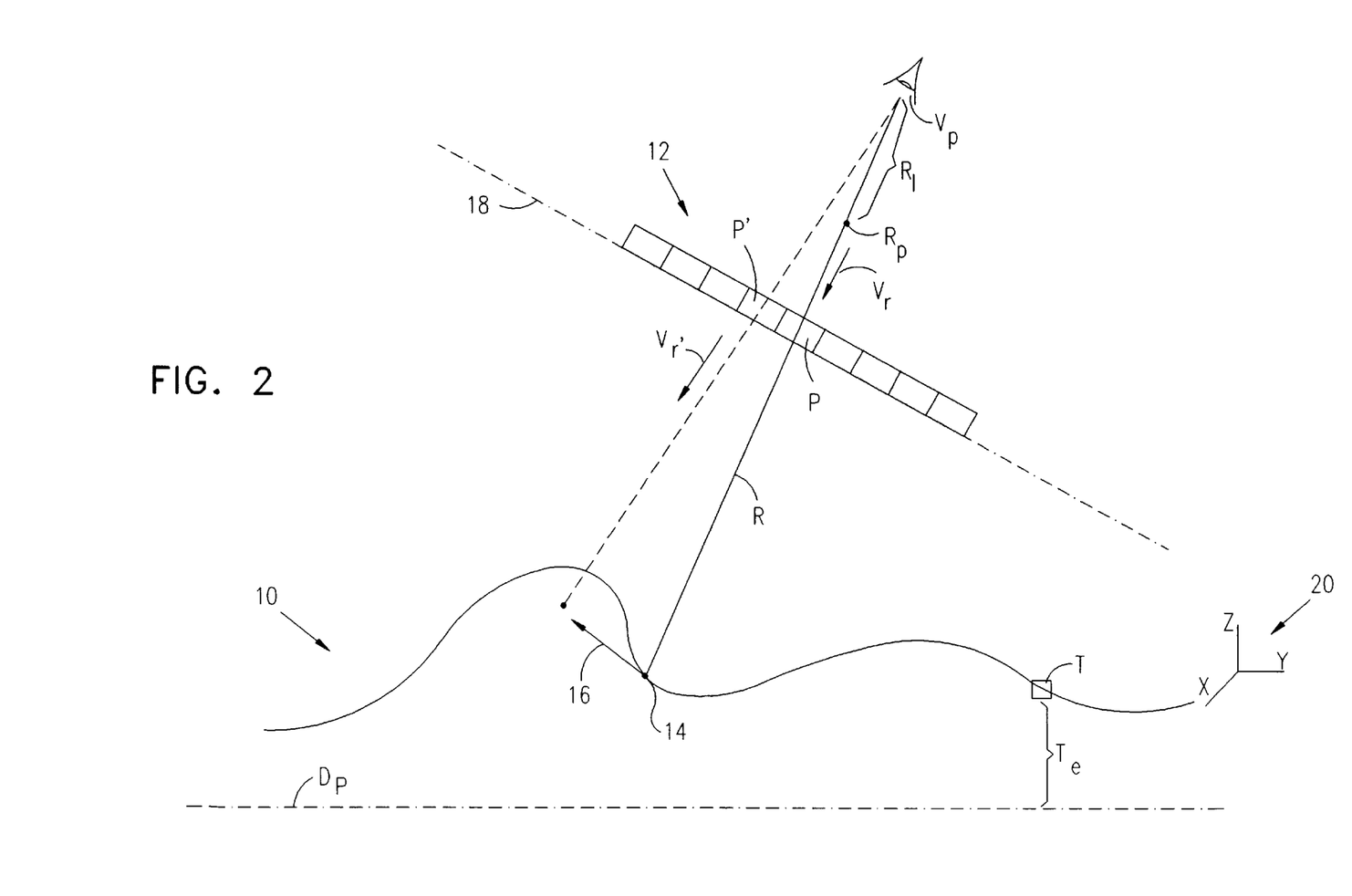
FIG. 2 is a simplified pictorial illustration of using the method of Figs. 1A–1C.

Reference is now made to FIGS. 1A–1C which, taken together, are simplified flowchart illustrations of a terrain rendering method constructed and operative in accordance with a preferred embodiment of the present invention, and FIG. 2 which is a simplified pictorial illustration of using the method of FIGS. 1A–1C. It is appreciated that the method of FIGS. 1A–1C may be implemented partly in computer hardware and partly in software, or entirely in custom hardware. Preferably, the apparatus of the present invention is implemented in suitably programmed computer hardware comprising, for example, a Pentium-Pro/MNX based central processing unit (CPU).

It is appreciated that the method of FIGS. 1A–1C, as well as other methods described hereinbelow, need not necessarily be performed in a particular order, and that in fact, for reasons of implementation, a particular implementation of the methods may be performed in a different order than another particular implementation.

In the method of FIGS. 1A–1C an image of a terrain 10 to be rendered for viewing on a display 12 is provided (step 100), preferably stored in a data base as a hierarchy of two-dimensional grids of tiles containing picture elements, with each grid representing the image at a given resolution. Each picture element, referred to herein as a terrain unit T, typically comprises at least color and elevation attributes $T_e$, with $T_e$ expressed relative to a data plane $D_p$ where $T_e$=0 for all T. The location of a terrain unit T is preferably expressed using a Cartesian coordinate system as indicated by 20 in accordance with known methods. While a variety of image storage methods may be used, a preferred method for storing a terrain image is described in greater detail hereinbelow with reference to FIGS. 3A and 3B. Preferably, the display is divided into one or more quadrants and the scan direction of pixels within each row and rows within each quadrant is then determined (step 120). While a variety of scanning methods may be used, a preferred method for determining the display division and the scan direction that accommodates sharp changes in terrain as viewed from adjacent pixels (e.g., the terrain unit for one pixel is on the ground, and the terrain unit for the next pixel is on top of a building) is described in greater detail hereinbelow with reference to FIGS. 4, 5A, and 5B. Typically, one quadrant is scanned at a time (step 130), and one quadrant row at a time (step 140), with the scan direction from row to row and from pixel to pixel within the row having been determined in step 120. A row as referred to herein typically comprises any run of display pixels, as is known. A starting pixel P is chosen (step 150). Given a view point $V_p$, a vector $V_r$ is calculated for a ray R (step 160). A starting point $R_p$ is determined along vector $V_r$ given a starting ray length $R_l$ (step 170). $R_p$ may be expressed using Cartesian coordinates $\{X_{rp}, Y_{rp}, Z_{rp}\}$ relative to the data plane containing all terrain units T as described hereinabove. A terrain unit data point T is retrieved from a data storage medium using the $\{X_{rp}, Y_{rp}\}$ coordinates of $R_p$ and the $Log_{2\ of\ Rl}$, referred to herein as d, corresponding to the grid level in the data hierarchy as described hereinabove (step 180). Each terrain unit T is typically retrieved as part of a data tile from a volatile and/or non-volatile data storage medium as is known. A preferred method of managing retrieval from a non-volatile data storage medium such as a hard disk drive is described in greater detail hereinbelow with reference to FIG. 6. A preferred method of managing retrieval from a volatile data storage medium such as a memory cache is described in greater detail hereinbelow with reference to FIG. 7. Each T typically comprises an elevation $T_e$, which is compared to $Z_{rp}$ (step 190). A tolerance may be provided, typically allowing $T_e$ to be "equal" to $Z_{rp}$ if it is within one terrain unit width. A $Z_{rp}$ value greater than $T_e$ indicates that $R_l$ is insufficient for $R_p$ to contact terrain 10, requiring that $R_l$ be increased (step 200). A $Z_{rp}$ value less than $T_e$, indicates that $R_p$ is below the surface of terrain 10, requiring that $R_l$ be decreased (step 210). Processing continues with step 170 after $R_l$ is increased (step 200) or decreased (step 210). While a variety of known methods may be used for increasing and decreasing $R_l$, a preferred method for doing so is described in greater detail hereinbelow with reference to FIG. 8. If $Z_{rp}$ is equal to $T_e$ or within the set tolerance, then $R_p$ has contacted terrain 10 at a contact point 14, and pixel P is then set to the color of the terrain unit T (step 220) and $R_l$ is stored in a z-buffer as is known (step 230). If current pixel P is not the last in the current row (step 240), the next pixel P' in the row becomes the current pixel P (step 250). A new ray length $R_l$ is preferably determined as the least of the current ray length $R_l$ and the ray length stored in the z-buffer corresponding to a pixel in the row immediately preceding the current row and in the same row position as the new current pixel P (step 260). Where the row is the first row in a quadrant to be scanned, the starting ray length $R_l$ described in step 170 may be used. Processing continues with step 160 where a new vector $V_r$ is calculated corresponding to $V_r$'. The resulting ray point $R_p$ generated after step 170 will typically lie along an axis 16 that is generally parallel to a display row axis 18. If current pixel P is the last in the current row (step 240), if the current row is not the last row in the quadrant (step 270) then scanning advances to the next row in the quadrant (step 280) and processing continues with step 150. If the current row is the last in the quadrant (step 270), then if the current quadrant is not the last quadrant in the display (step 290) then scanning advances to the next quadrant in the display (step 300) and processing continues with step 140. One scan cycle is typically completed when all pixels in all rows in all quadrants in the display have been set as described above in step 220.

Figure 3A:
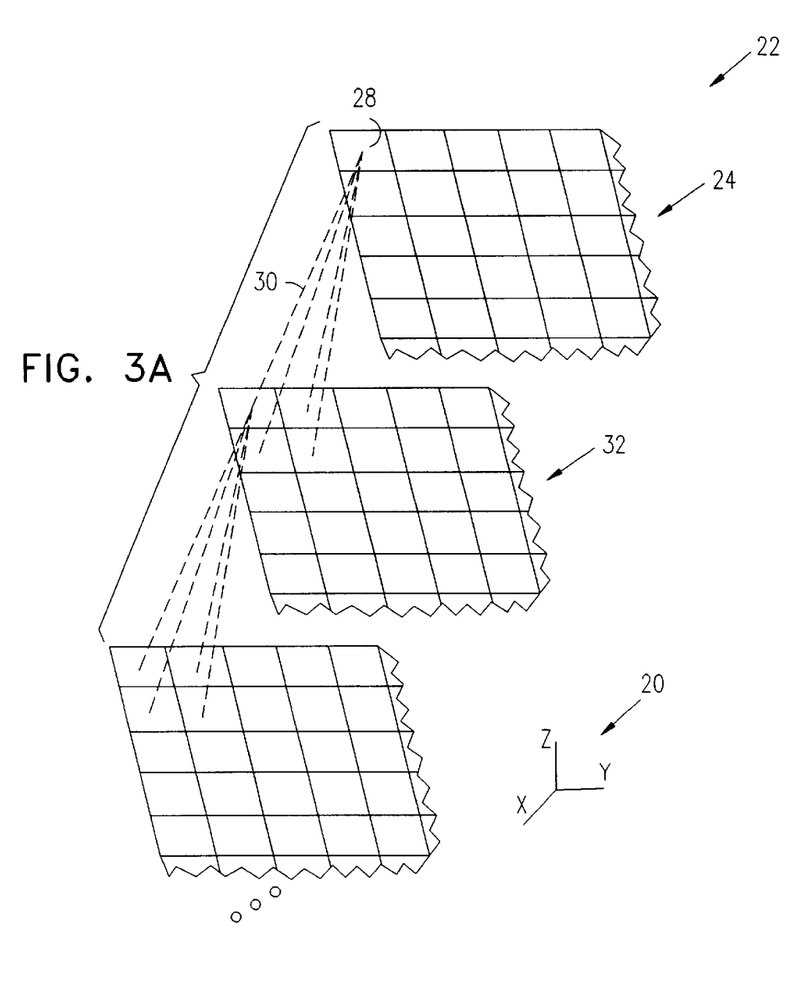
FIGS. 3A and 3B, taken together, are simplified pictorial illustrations of a data structure useful in storing a terrain image constructed and operative in accordance with a preferred embodiment of the present invention.
Figure 3B:
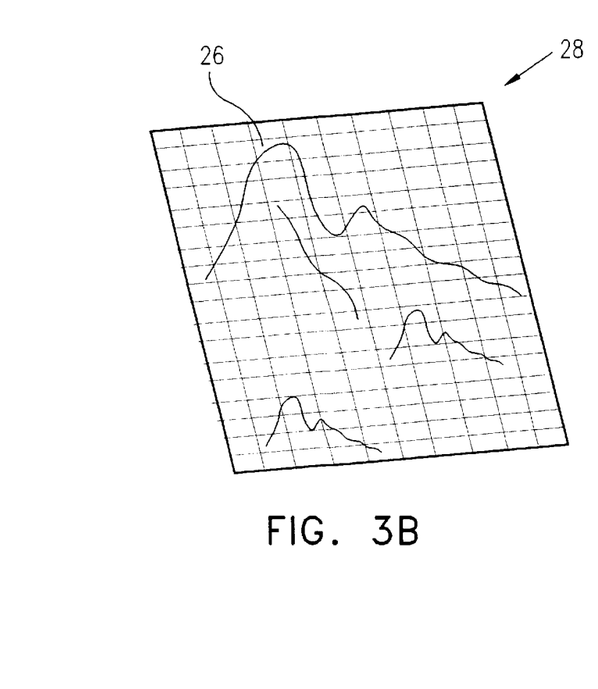

Reference is now made to FIGS. 3A and 3B which, taken together, are simplified pictorial illustrations of a data structure useful in storing a terrain image constructed and operative in accordance with a preferred embodiment of the present invention. A terrain image is typically stored as a hierarchy 22 of one or more two-dimensional grids 24 of one or more tiles 28, with each grid 24 representing the image at a given resolution. Each tile 28 typically comprises one or more picture elements 26, each representing a terrain unit T (FIG. 2) and having at least color and elevation attributes. Each tile 28 in a given resolution level typically has a fixed number of picture elements 26 (i.e. 256×256 picture elements). Each grid 24 has four times more detail then the grid preceding it in the hierarchy 22. There are preferably four pointers for each tile in grid 24, pointing to four tiles of greater resolution in a grid 32 that is below grid 24 in hierarchy 22. The number of levels of resolution in the grid hierarchy may be varied as needed. The location of each picture element 26/terrain unit T is preferably expressed using {X,Y} coordinates of a Cartesian coordinate system as indicated by 20, and a level indicator.

Figure 4:
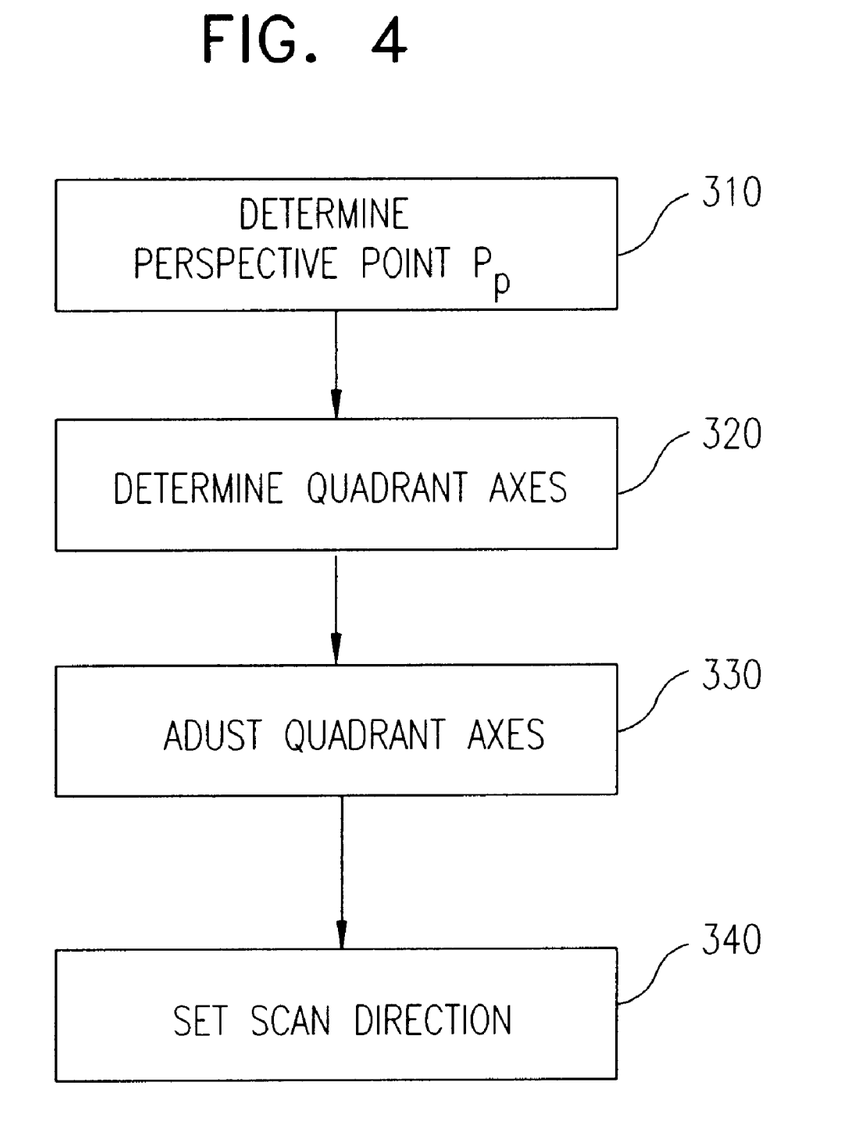
FIG. 4 is a simplified flowchart illustration of a method of determining scan direction constructed and operative in accordance with a preferred embodiment of the present invention.
Figure 5A:
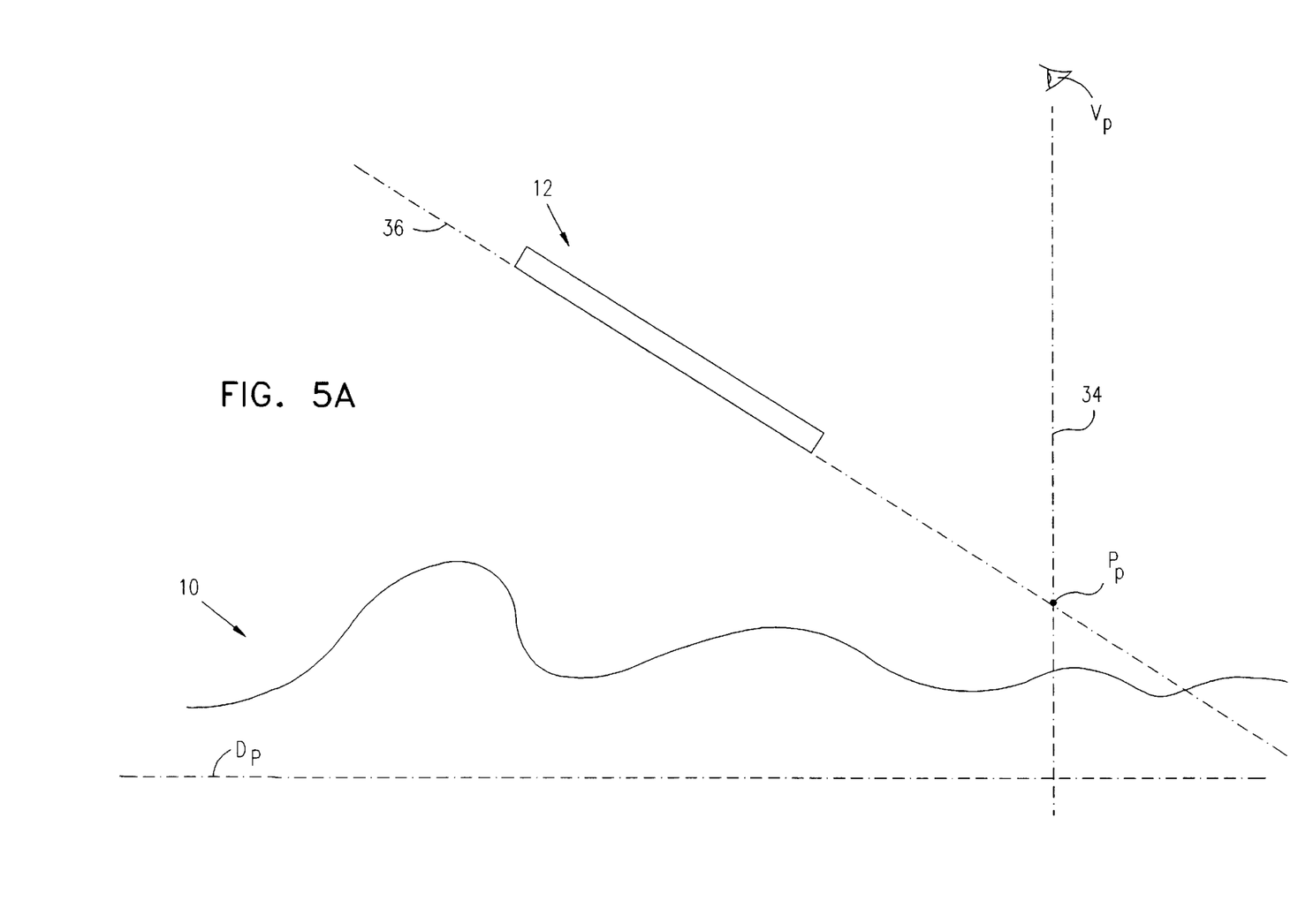
FIGS. 5A and 5B are simplified pictorial illustrations of using the method of FIG. 4.
Figure 5B:
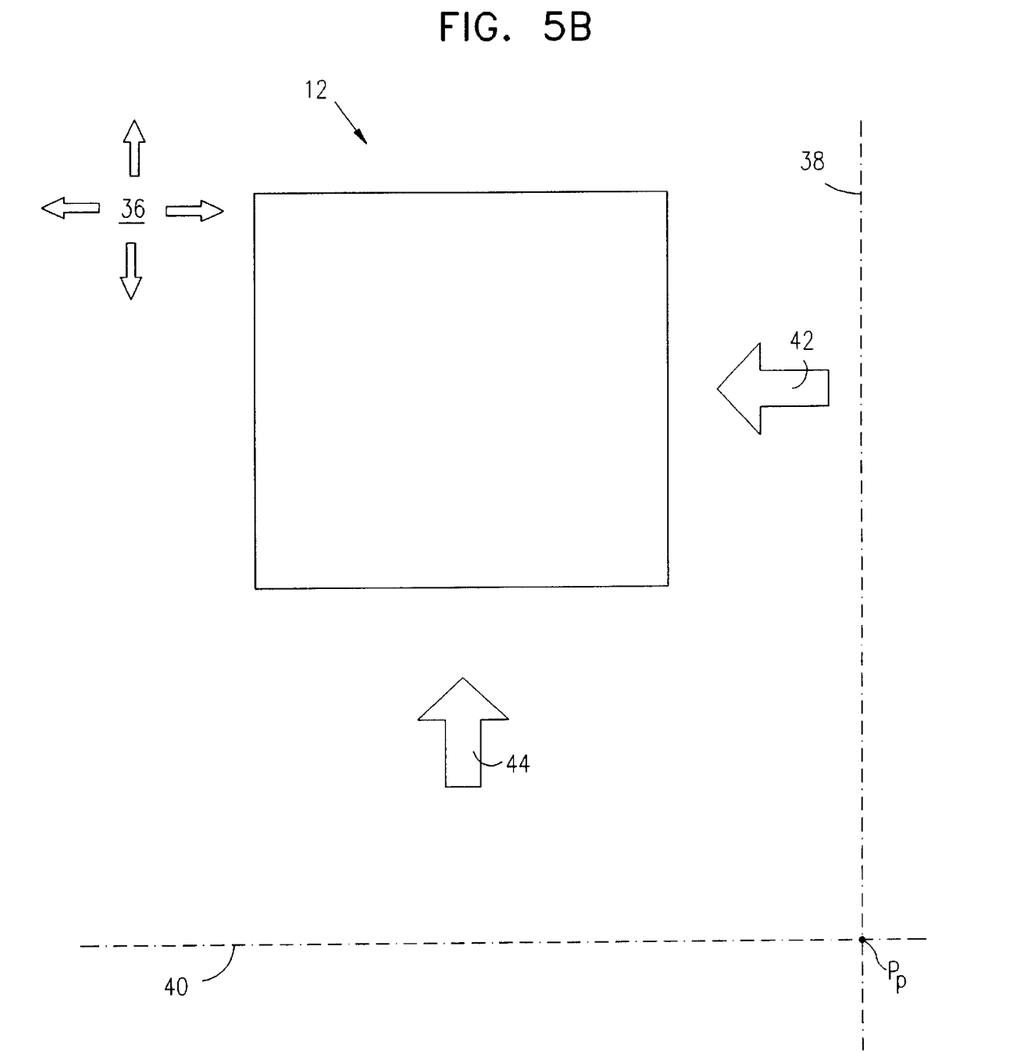

Reference is now made to FIG. 4 which is a simplified flowchart illustration of a method of determining scan direction constructed and operative in accordance with a preferred embodiment of the present invention, and FIGS. 5A and 5B which are simplified pictorial illustrations of using the method of FIG. 4. In the method of FIG. 4, an axis 34 is provided, passing through view point $V_p$ and data plane $D_p$ of terrain 10, wherein axis 34 is perpendicular to data plane $D_p$. A perspective point $P_p$ is defined at the intersection of axis 34 and display plane 36 in which display 12 lies (step 310). Where axis 34 and display plane 36 are parallel, either may be arbitrarily varied until they intersect. Axis 34 is projected onto display plane 36 to provide a longitudinal quadrant axis 38, and a latitudinal quadrant axis 40 is provided at perspective point $P_p$ perpendicular to longitudinal quadrant axis 38 (step 320). Should perspective point $P_p$ lie outside of display 12, one or both of axes 38 and 40 may be moved as needed in the directions indicated by arrows 42 and 44 respectively until perspective point $P_p$ meets an edge of display 12 (step 330). The scan direction may be set based on the relative locations of the view point $V_p$, the perspective point $P_p$, and the data plane $D_p$ as follows: if view point $V_p$ is "above" perspective point $P_p$, the scan direction is away from perspective point $P_p$, and if view point $V_p$ is "below" perspective point $P_p$, the scan direction is toward perspective point $P_p$ (step 340).

Figure 6:
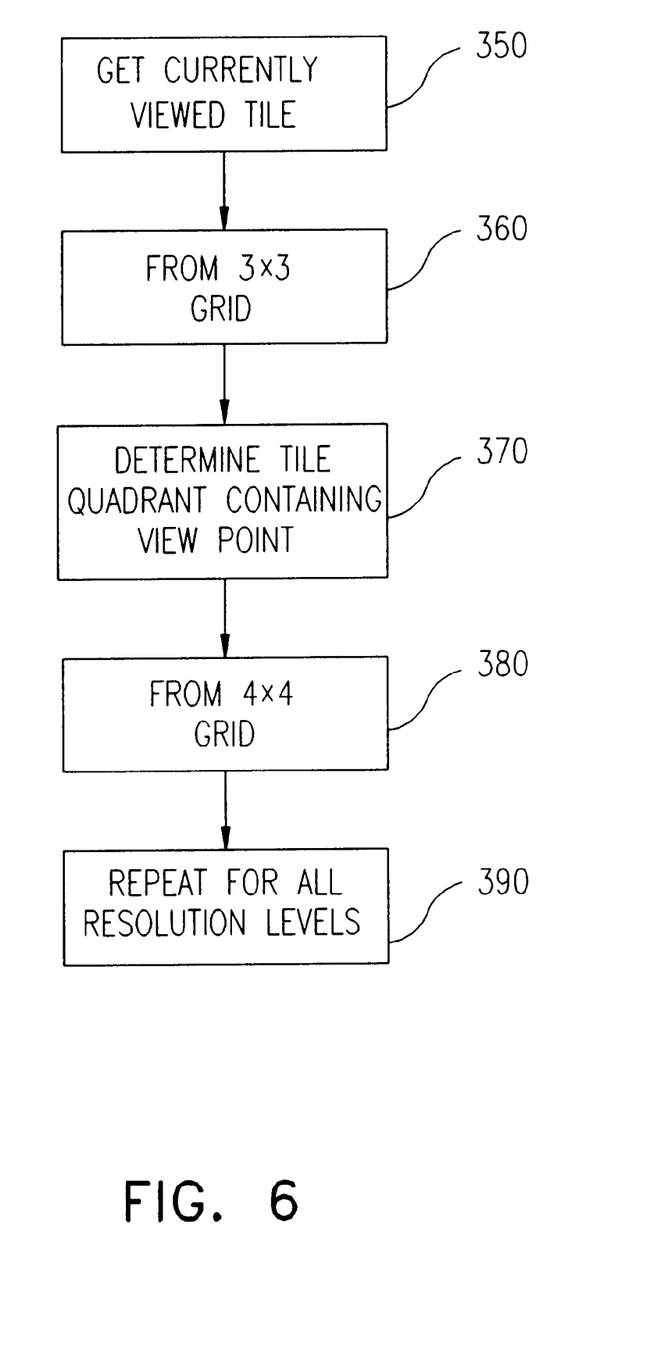
FIG. 6 is a simplified flowchart illustration of a method of managing retrieval from a non-volatile data storage medium useful in the method of FIGS. 1A–1C and constructed and operative in accordance with a preferred embodiment of the present invention.

Reference is now made to FIG. 6 which is a simplified flowchart illustration of a method of managing retrieval from a non-volatile data storage medium useful in the method of FIGS. 1A–1C and constructed and operative in accordance with a preferred embodiment of the present invention. In the method of FIG. 6 a disk cache is preferably used to continuously maintain a four by four grid of tiles around the current view point in all resolution levels. The cached tiles are selected by first determining the currently viewed tile in which the view point "falls" (step 350). The eight tiles around the currently viewed tile are preferably brought into the disk cache to form a 3×3 grid (step 360). The currently viewed tile is then preferably divided into four quadrants, and the quadrant in which the view point "falls" is determined (step 370). Then, depending on which quadrant of the currently viewed tile the view point is situated, seven more tiles are preferably brought into cache. Typically, the additional seven tiles are selected based on which quadrant of the currently viewed tile the view point falls. Thus, if the view point is in the top left quadrant of the currently viewed tile, seven more tiles around the currently viewed tile's left and top are brought into cache to form a 4×4 grid (step 380). A corresponding tile grid is preferably brought into disk cache for each resolution level (step 390). As the view point moves out of a tile quadrant, new tiles are brought into cache as needed. This allows for all the necessary data to be available during rendering, even when rotating the view very quickly, as only the view point matters, and not the view direction.

Figure 7:
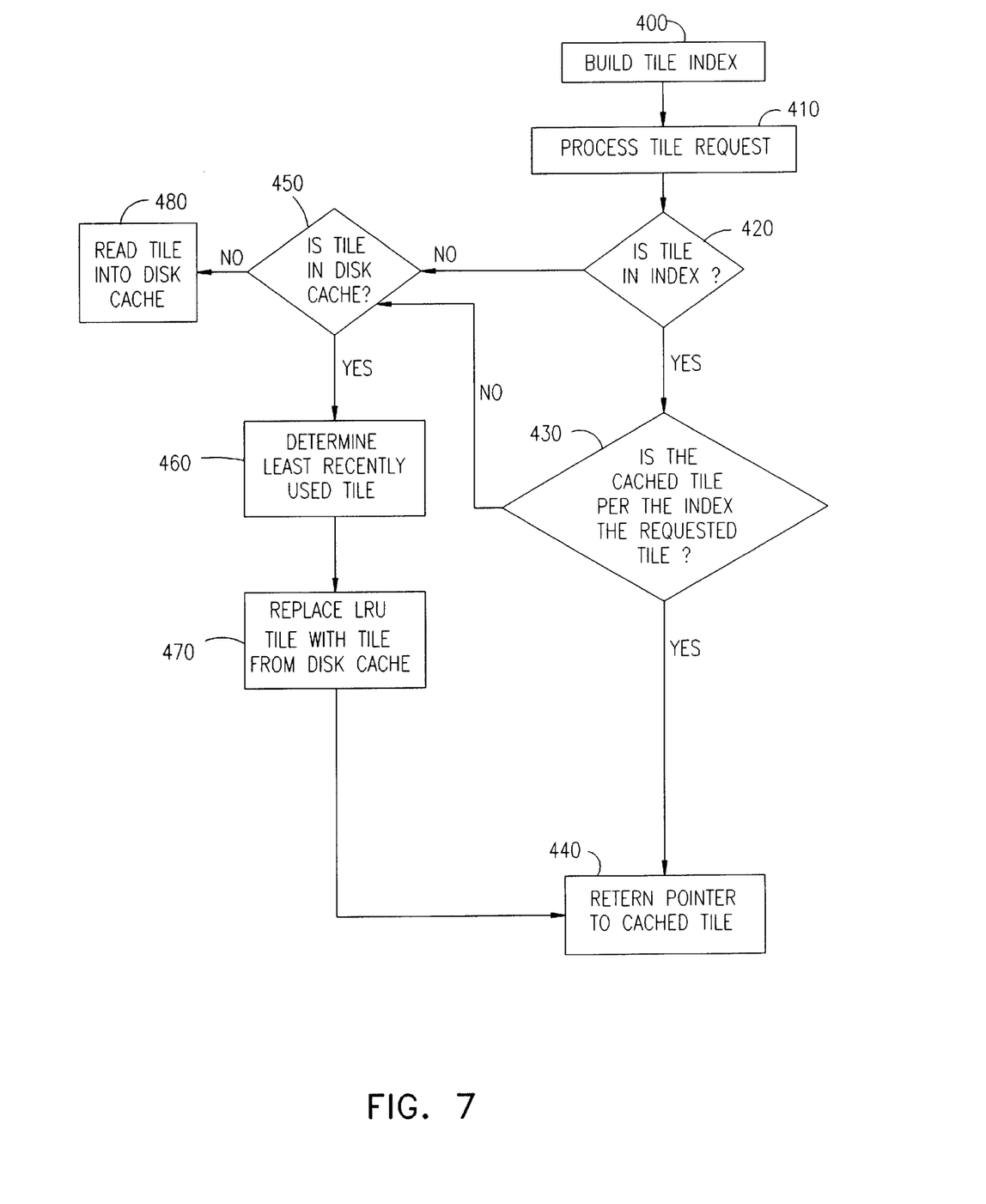
FIG. 7 is a simplified flowchart illustration of a method of managing retrieval from a volatile data storage medium useful in the method of FIGS. 1A–1C and constructed and operative in accordance with a preferred embodiment of the present invention.

Reference is now made to FIG. 7 which is a simplified flowchart illustration of a method of managing retrieval from a volatile data storage medium useful in the method of FIGS. 1A–1C and constructed and operative in accordance with a preferred embodiment of the present invention. In the method of FIG. 7 an LRU (Last Recently Used) type memory cache system is used. Tiles may be used that are not necessarily the same size as the disk cache tiles. An index is preferably built fron the five least significant bits of the {X, Y, d} coordinates of each tile (step 400). Each time a specific tile is requested by specifying {X, Y, d} coordinates (step 410), the index is checked for a match using the five least significant bits (step 420). If a match is found using the least significant bits, then the {X, Y, d} coordinates are checked to see if the correct tile has indeed been found (step 430). If this is also true, then a pointer to that tile is returned (step 440). If the requested tile is not found in the memory cache, then the disk cache is checked to see if the tile is available (step 450). If it is, the memory cache determines the least recently used tile by checking each tile counter and selecting the tile with the highest count, since each time a tile is requested and found its counter is reset to 0, and each rendering cycle all of the counters are incremented by one (step 460). The memory cache then replaces the least recently used tile with the requested tile (step 470) and returns its pointer (step 440). If the tile is not found in the disk cache, it is then read in, preferably as described hereinabove with reference to FIG. 6 (step 480).

It is appreciated that for tiles that do not exist (e.g., at a level of detail higher then the source data) interpolation may be used as is known in the art to build the requested tile from the first grid level below it that is available. This interpolation may be bilinear, fractal, texture blending, or any suitable method. The interpolation is preferably performed to a predetermined level, thus avoiding pixelation effect.

Figure 8:
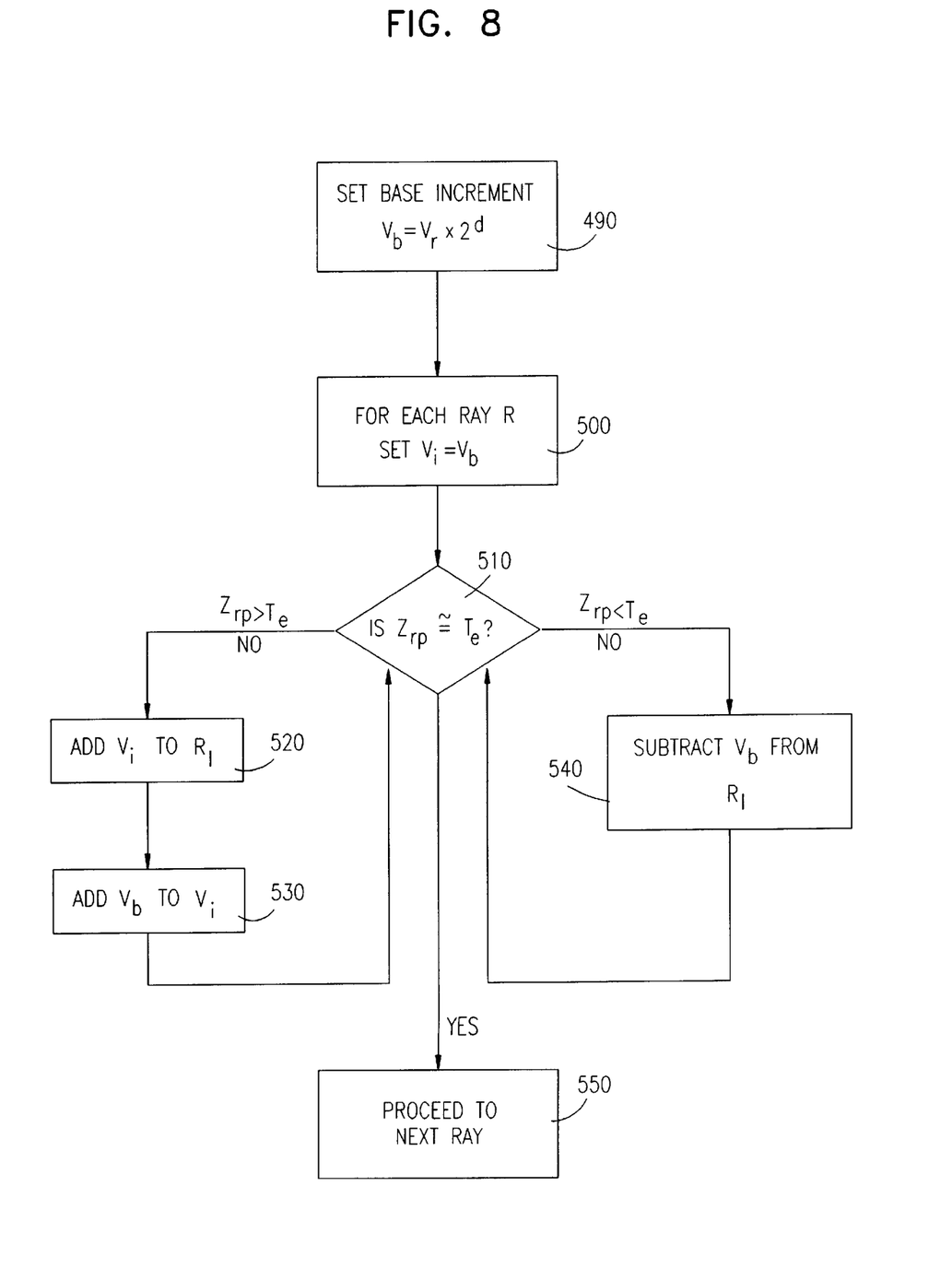
FIG. 8 is a simplified flowchart illustration of a method of increasing and decreasing $R_l$ useful in the method of FIGS. 1A–1C and constructed and operative in accordance with a preferred embodiment of the present invention.

Reference is now made to FIG. 8 which is a simplified flowchart illustration of a method of increasing and decreasing $R_l$ useful in the method of FIGS. 1A–1C and constructed and operative in accordance with a preferred embodiment of the present invention. A base increment value $V_b$ is set equal to $V_r \times 2^d$. For each ray R, an increment value $V_i$ is initially set to $V_b$ (step 500). $Z_{rp}$ is then compared to $T_e$ (step 510). If $Z_{rp}$ is greater than $T_e$ (i.e., $R_p$ is above the ground), then $V_i$ is added to $R_l$ to get a new $R_p$ (step 520), and $V_i$ is increased by adding $V_b$ to $V_i$ (step 530). If $Z_{rp}$ is less than $T_e$ (i.e., $R_p$ is below the ground), then $R_l$ is decreased by $V_b$ (step 540). $R_l$ is increased or decreased in this manner until $Z_{rp}$ equals $T_e$ (i.e., $R_p$ has reached the surface), typically within a predetermined tolerance, and processing continues with the next ray (step 550).

A preferred method for constructing a three-dimensional terrain rendering system operative in accordance with a preferred embodiment of the present invention is now described:

a) Provide a computer terminal, such as an Intel-based Pentium MMx 166 Mhz computer, configured with the Microsoft Windows 95 operating system and Microsoft DirectX 3.0;

b) Generate binary file MPTDLL.DLL from the computer listing of Appendix A, binary executable file TESTDLL.EXE from the computer listing of Appendix B, binary file MAP.MPT from the computer listing of Appendix C, and text file MAP.HDR from page C-42 of Appendix C;

c) Load the files generated in step b) into a directory of the computer terminal provided in step a) and execute TESTDLL.EXE.

It is appreciated that any of the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A method for rendering a three-dimensional terrain, the method comprising:

providing a plurality of previous display pixels, each of said plurality of previous display pixels having a previous ray with a length from a point of view through said previous display pixel to a previous terrain unit intersecting an axis of said previous ray;

determining a starting value of a length of a subsequent ray from said point of view through a subsequent display pixel to a subsequent terrain unit intersecting an axis of said subsequent ray, said determining step comprising setting said starting value to the shortest of said lengths of at least two of said previous rays; and repeatedly increasing or decreasing said starting value until said length of said subsequent ray is reached or reached with a predetermined tolerance, each of said repeated increasing and decreasing includes using, at least once, an increment equal to $V_r + 2^d$ where $V_r$ is equal to a unit vector value of said subsequent ray and d is equal to $\text{Log}_2$ of said length of said subsequent ray.

2. The method of claim 1 wherein said providing step comprises tracing each of said previous rays through one of said plurality of previous display pixels.

3. The method of claim 1 wherein said providing step comprises previously computing each of said previous rays' lengths.

4. The method of claim 1 wherein said determining step further comprises setting said starting value to the shortest of said lengths of two of said previous rays that are associated with two of said plurality of previous display pixels that are adjacent to said subsequent display pixel.

5. A method according to claim 1 and further comprising the step of maintaining any of said lengths in a Z-buffer, and wherein said providing step comprises retrieving any of said lengths from said Z-buffer.

6. The method of claim 1 wherein said repeated increasing comprises:

(a) increasing said starting value by a factor; and (b) incrementing said factor by said increment subsequent to said step (a).

7. The method of claim 1 wherein said repeated decreasing comprises decreasing said starting value by said increment.

8. Three-dimensional terrain rendering apparatus comprising:

a display including a plurality of display pixels;

a memory for storing information about a plurality of previous ones of the display pixels, each of said previous display pixels having a previous ray with a length from a point of view through said previous display pixel to a previous terrain unit intersecting an axis of said previous ray; and apparatus for accessing said memory and computing a length of a subsequent ray from said point of view through a subsequent one of said display pixels to a subsequent terrain unit intersecting an axis of said subsequent ray, wherein said computing includes setting a starting value of said length of said subsequent ray to the shortest of said lengths of at least two of said previous rays and said computing further includes repeatedly increasing or decreasing said starting value until said length of said subsequent ray is reached or reached with a predetermined tolerance wherein each of said repeated increasing and decreasing includes using, at least once, an increment equal to $V_r + 2^d$ where $V_r$ is equal to a unit vector value of said subsequent ray and d is equal to $\text{Log}_2$ of said length of said subsequent ray.

* * * * *